United States Patent [19]
Carlson

[11] 3,845,878
[45] Nov. 5, 1974

[54] SAFETY VENT SYSTEM FOR TANKS
[75] Inventor: Edwin S. Carlson, Saint Charles, Mo.
[73] Assignee: ACF Industries, Incorporated, New York, N.Y.
[22] Filed: Nov. 3, 1972
[21] Appl. No.: 303,350

[52] U.S. Cl. .............................. 220/89 A, 137/68
[51] Int. Cl. ...................... B65d 25/00, F16k 17/14
[58] Field of Search ............ 220/89 R, 89 A, 89 B, 220/DIG. 27, 46 p; 137/68

[56] References Cited
UNITED STATES PATENTS

| | | | |
|---|---|---|---|
| 2,230,961 | 2/1941 | Lewis | 220/89 A |
| 2,256,673 | 9/1941 | Hansen | 220/89 A |
| 2,346,183 | 4/1944 | Paolus et al. | 220/89 A |
| 2,440,462 | 4/1948 | Cooper | 220/89 A |
| 3,064,740 | 11/1962 | Knapp | 220/89 B |
| 3,247,859 | 4/1966 | Traut et al. | 220/89 A |
| 3,515,309 | 6/1970 | Welch | 220/89 A |

FOREIGN PATENTS OR APPLICATIONS

| | | | |
|---|---|---|---|
| 1,186,718 | 2/1965 | Germany | 220/89 A |
| 917,061 | 1/1963 | Great Britain | 220/89 A |

Primary Examiner—William I. Price
Assistant Examiner—Joseph Man-Fu Moy
Attorney, Agent, or Firm—Henry W. Cummings

[57] ABSTRACT

In accordance with the present invention, a safety vent system is provided comprising a burst plate or disk and pressure absorbing means whereby the high pressures encountered during pressure surges, for example, caused by impacts on the tank will be absorbed by the pressure absorbing means and the burst disk will not vent the tank during such surges. However, when the non-surge pressure in the tank reaches approximately design level, the plate or disk will burst and vent the tank. In one embodiment movement of the pressure absorbing means regulates movement of the rupturable member. Baffle means may also be provided to absorb a portion of the surge energy. Means are preferably provided to direct the chemicals vented during the burst in a direction to avoid contact with personnel which may be near the tank during venting.

21 Claims, 11 Drawing Figures

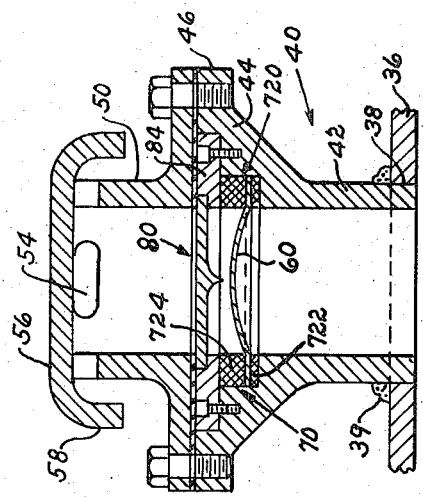
FIG. 1.
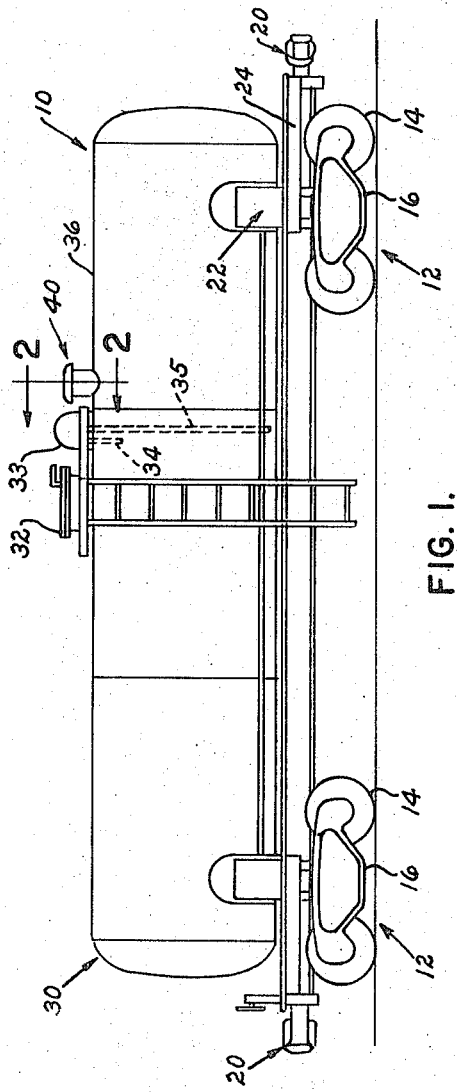
FIG. 3.
FIG. 2.
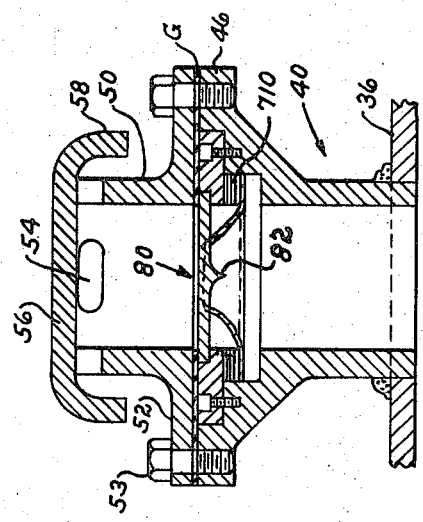
FIG. 5.
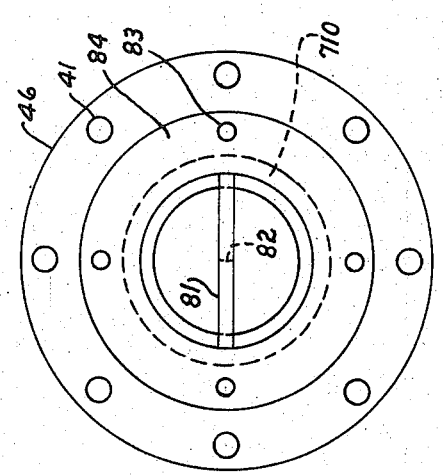
FIG. 4.

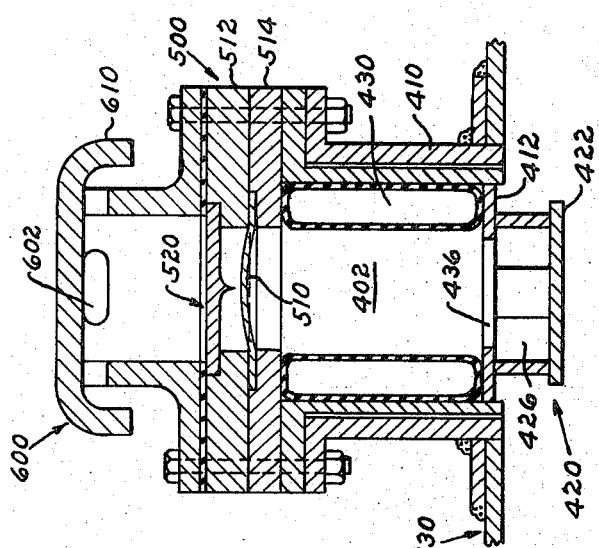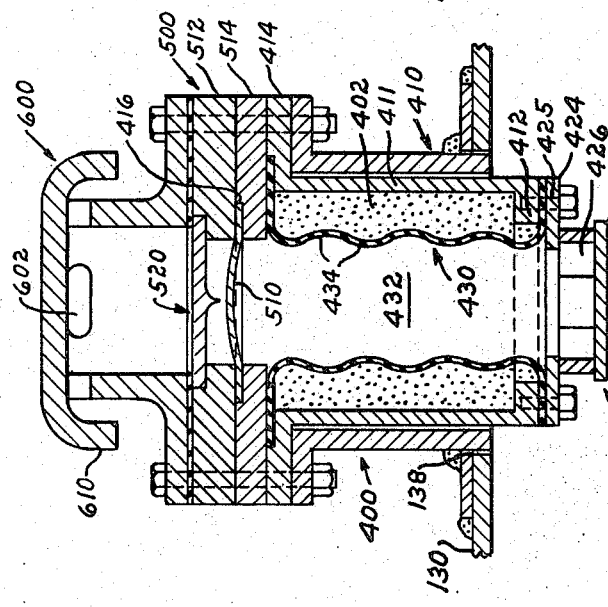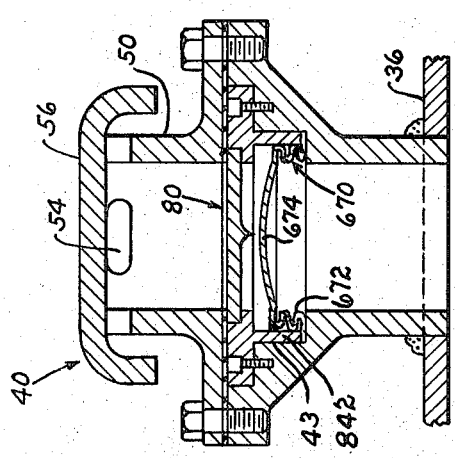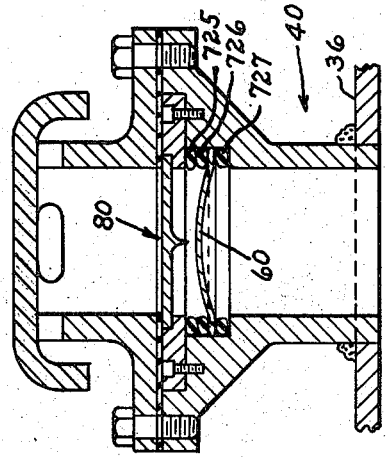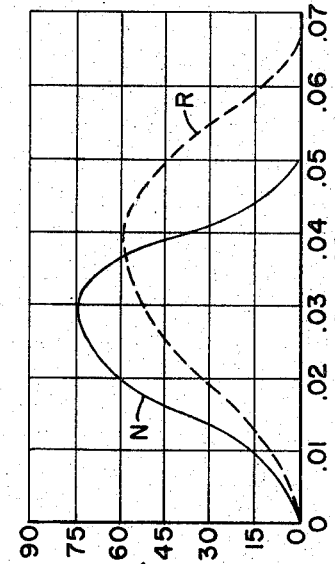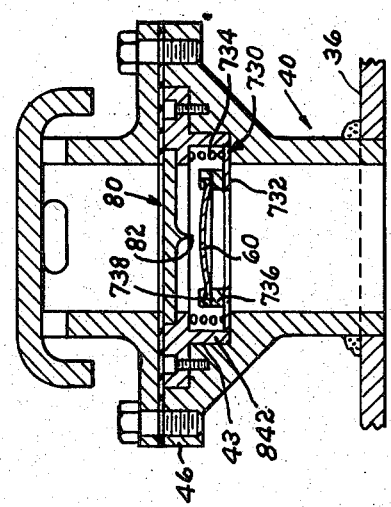

SAFETY VENT SYSTEM FOR TANKS

BACKGROUND OF THE INVENTION

This invention relates to tanks which are transported either on railroad cars, in overland trucks, and in some applications to tanks transported in ships. In all of these modes of travel, a danger exists that the pressure may build up in the tank, for example, because of increased temperature encountered during transit, and because of the added pressure, the tank bursts. Not only is there resulting property damage to the tank and to surrounding apparatus, but also there is great danger to workmen and persons who may be nearby at the time of the explosion. The danger is particularly acute when the tanks contain corrosive or dangerous liquids, such as sodium hydroxide, sulfuric and hydrochloric acids and certain hydrocarbon chemicals, because of the high risk of personal injury to individuals if the chemicals escape.

One solution of this problem has been to provide the tanks with burst disks with or without cutter bars. In the event that the pressure within the tank builds up to a certain design pressure, the disk will burst and relieve the pressure in the tank. This avoids an explosion of the magnitude encountered if the whole tank explodes. However, this burst disk arrangement has the disadvantage that any workmen or other persons around the tanks at the time of the disk's rupture can be seriously injured by splash from these chemicals.

One problem which has been encountered with respect to the burst disk safety arrangement, particularly when mounted in railroad tank cars which are subjected to impact during coupling of cars, is that pressure surges are developed within the tanks resulting from the coupling impacts. In the case of railroad cars, the pressure surges are of short duration and are generally completed within from about 0.05 to 0.08 seconds. However, these pressure surges often cause the disk to burst when the static or non-surge pressure in the tank is not sufficient to warrant the disk bursting. Thus the problem presented is one of how to prevent the disk from bursting under short term impact pressures within the tank, and at the same time insure that the disk will burst when the static or non-surge pressure in the tank has increased to a dangerous level. Similar impact pressure build-ups occur in some applications in overland tank car trucks and in tanks carried on ships. Thus similar problems exist regarding the bursting of disks in these applications.

OBJECTS

It therefore is an object of the present invention to provide a burst disk arrangement which will not burst or vent during short term impact pressures but will vent at approximately designed pressure when the non-surge pressure build-up within the tank reaches approximately design level.

SUMMARY OF THE INVENTION

In accordance with the present invention, a safety vent system is provided comprising a burst plate or disk and pressure absorbing means whereby the high pressures encountered during pressure surges, for example, caused by impacts on the tank will be absorbed by the pressure absorbing means and the burst disk will not vent the tank during such surges. However, when the non-surge pressure in the tank reaches approximately design level, the plate or disk will burst and vent the tank. In one embodiment movement of the pressure absorbing means regulates movement of the rupturable member. Baffle means may also be provided to absorb a portion of the surge energy. Means are preferably provided to direct the chemicals vented during the burst in a direction to avoid contact with personnel which may be near the tank during venting.

Other objects will be apparent from the following description and drawings.

THE DRAWINGS

FIG. 1 is a side elevational view of a railroad tank car;

FIG. 2 is a sectional view along the line 2—2 in FIG. 1 illustrating a burst disk arrangement in accordance with the present invention;

FIG. 3 is a sectional view along the line 3—3 in FIG. 2;

FIG. 4 is a sectional view similar to FIG. 2 illustrating the disk bursting;

FIG. 5 is a view similar to FIG. 2 illustrating an alternative construction;

FIG. 5A is a partial sectional view similar to FIG. 5 illustrating a modification of the arrangement shown in FIG. 5;

FIG. 6 is a view similar to FIG. 2 illustrating another alternative construction;

FIG. 7 is a view similar to FIG. 2 illustrating still another alternative arrangement;

FIG. 8 is a view similar to FIG. 2 illustrating another embodiment of the present invention;

FIG. 9 is a view similar to FIG. 8 illustrating an alternative of the embodiment shown in FIG. 8; and FIG. 10 is plot of surge pressure against the tine of the surge (Curve N) and illustrating the effect a resilient means has on the pressure-time relationship (Curve R).

DETAILED DESCRIPTION

The present invention will be described in connection with a railroad tank car. However, it is to be understood that the safety vent system of the present invention is not limited to use in railroad tank cars, but rather may be used in overland tank trucks, in tanks transported by boats or ships, or in any other transportation or storage application where pressure surges are a problem in tanks carrying liquid and/or gaseous lading.

FIG. 1 shows a railroad car 10 having conventional trucks 12 including wheels 14, conventional side frames 16, and a conventional truck bolsters (not shown). A conventional coupler structure 20 is also provided. The tank 30 is supported upon the car by means of tank bolster structure 22 mounted upon sill 24 and supported by the truck bolster.

A hatch opening 32 is provided for entering or loading the car. An unloading arrangement 33 is also provided housing valves (not shown) suitable to pressure the car by means of short conduit 34 and discharge the lading through long conduit 35 in the usual manner. One or more discharge outlets could also be provided for discharging the tanks at the bottom thereof by gravity, if desired. All of the structure described so far is known in the art.

In accordance with the present invention tank 30 is provided with a safety vent system indicated generally at 40. Mounted upon the upper portion 36 of the tank through an opening therein 38 in communication with the tank interior, attached, for example, by welding 39 is a hollow vent member 42, preferably cylindrical. Vent member 42 may have a portion of increased cross section 44 to define a flange portion 46 having bolt openings therein 41. The inside of hollow member 42 may include a a first recessed portion indicated at 43 and a second recessed portion indicated at 48.

The safety vent system is also provided with an upper hollow vent member 50 preferably cylindrical having an outwardly extending flange portion 52. Upper portion 50 is also provided with openings 54 arranged circumferentially therearound. A cover 56 is bolted or otherwise affixed to the hollow member 50 or may be integral therewith, for example, as part of a single casting. Upper vent member 50 is held in engagement with lower vent member 42 with appropriate fasteners such as bolts 53 passing through openings 51 and 41.

A burst plate 60, preferably circular or disk-shaped, is mounted within hollow member 42 and has mounted in cooperation therewith a resilient means 70. Burst plate 60 will have the necessary characteristic of bursting or venting at designed pressure, within certain pressure tolerances. The plate or disk may be made, for example, of metal, alloy, or plastic and may comprise one or more portions of thin cross sectional area, or other means to allow pressure to rupture the same at a near design pressure. Resilient means 70 may comprise a spring, bellows or an elastomer or other resilient means having an appropriate spring constant to absorb pressure energy and protect plate or disk 60 from rupturing or bursting during pressure surges in the tank. Also preferably mounted within hollow members 42 and 50 is a cutting means 80 which may comprise, for example, a cutter bar 81 having a cutter point or plane 82 thereon spaced from disc 60. Cutter bar 81 may be mounted upon a plate 84 which is bolted through openings 83 or otherwise affixed to lower hollow member 42. A gasket G or other appropriate sealing means is preferably provided between upper and lower hollow member 42 and 50.

As shown in FIG. 2, burst plate 60 is held in place by resilient means 710. The spring rate of resilient means 710 is designed so that the resilient means will absorb the surge pressure generated by impacts applied to the transportation vehicle and prevent the disk or plate from rupturing during such surges. For example, such surges are generated in a railroad car during coupling and uncoupling of the car or other cars in the train. In an overland truck, sudden stopping and starting, or during loading and unloading of the tanks the surges can be generated. In tanks carried in boats and ships, the sudden surges may be encountered during inclement weather on the rivers or seas and during docking, loading and/or unloading. Not only does the resilient means absorb surge energy, it also lengthens the time that the surge pressure is applied to the burst plate or disk Thus a time delay occurs as the resilient means is deflected. Normally, for railroad coupling and uncoupling impacts, the surge pressure has peaked and returned to near non-surge pressure in about 0.05 to 0.08 seconds as shown in curve N in FIG. 10. However, with the resilient deflection, this time is increased to about 0.08 to 0.12 seconds, and the peak surge pressure is lower because the pressure is applied to the burst disk over a greater time period because of the resilient deflection. This is illustrated in curve R in FIG. 10.

Thus although applicant does not wish his invention to be limited to any particular theory of operation, it is believed that the combination of the resilient means absorbing surge pressure energy, and delaying the application of this surge energy so that it is applied to the burst plate over a longer period and at a lower maximum surge pressure may at least partly explain the mechanism involved. Thus, in the normal surge situation, the resilient means 710 because of its spring constant will resist movement of the burst plate toward the cutter bar 82 during the short time period when the surge would normally break the plate. Even if the burst plate contacts the cutter bar, the resilient means continues to resist the surge so that the surge must do additional work on the plate to burst the same. Gradually the surge pressure is dissipated and the resilient means moves the burst plate back to the position shown in FIG. 2.

On the other hand, under continued high pressure within the tank or where extremely high surges are encountered of a dangerous character, the resilient means will be deflected and sufficient work done to burst plate 60 and the system will vent through openings 54 as is illustrated in FIG. 4. Cover 56 is preferably provided with an overhang portion 58 to guide the material down to the top of the tank and avoid chemicals from flying laterally and increasing the chances of injury to personnel.

The embodiment shown in FIG. 5 is similar to the embodiment shown in FIGS. 2–4 with the exception of resilient means 70. In this embodiment resilient means 70 comprises an elastomeric member 720. Burst disk 60 is mounted between lower and upper portions of resilient means 720, respectively 722 and 724, which are preferably elastomeric packings. This embodiment has the added advantage of providing a seal between enlarged hollow portion 44 and cutter blade mounting plate 84.

As was the case with the embodiment shown in FIGS. 2–4, when a continued pressure above the spring constant for elastomeric portion 724 is achieved, the burst plate 60 will be ruptured by cutter bar 80 and the tank vented through openings 54 and guided downwardly by overhang 58.

In a modification of FIG. 5, shown in FIG. 5A, instead of having elastomeric packings 722 and 724, a series of O-ring type members 725, 726 and 727 may be provided to mount the burst disk 60. The construction is otherwise the same as shown and described in FIG. 5.

In still another embodiment of the present invention shown in FIG. 6, the resilient means 70 and the burst disk 60 of the previously described embodiments are combined in a single element 670. Cutter bar mounting plate 84 is provided with a downwardly depending extension 842 which holds the combined resilient means and burst plate 670 within recess 43. Combined resilient means-burst plate 670 includes a bellows portion 672 and a burst portion 674.

The spring constant of resilient means 670 must be designed to withstand surge pressures as described above and preferably delay the application of the surge pressure to burst plate portion 674 and delay contact with cutter bar 80. However, under continued pressure at desired design level, cutter bar 80 will burst portion 674 to vent the system as described in connection with embodiments described above and shown in FIGS. 2, 4 and 5.

In another embodiment shown in FIG. 7, the resilient means 730 comprises a diaphragm 732 and a coil spring 734. As was the case with the embodiment shown in FIG. 6, cutter bar mounting plate extension 842 holds the resilient means in place within recess 43. Rupture disk 60 is mounted on blocks 736 (made, for example, of plastic or elastomeric material) by means of appropriate flanges 738. Blocks 736 are supported on diaphragm 732. The spring constant of spring 734 must be overcome to allow cutter bar 80 to contact with the burst plate 60 to predetermined pressure. It is also believed that diaphragm 732 and spring 734 delay the application of the surge pressure and reduce the maximum thereof, as described above. The operation is the same as described in regard to FIGS. 2–6.

Another embodiment of the present invention is shown in FIG. 8. A tank 130 has an upper portion having an opening therein 138. Mounted within this opening is a vent system indicated generally at 400 and comprising a lower vent member 410 and an upper vent portion 500. In the upper vent portion 500 a rupture disk 510 is mounted between plates 512 and 514. A cutter bar 520 is mounted in plate 512 and is protected by cover 600. Lower vent portion 410 comprises a cylindrical member 411 having a lower flange portion 412 extending inwardly and an upper flange portion 414 extending outwardly. Lower flange portion 412 is connected, for example, with bolts to a baffle means indicated generally at 420. Baffle means 420 preferably comprises a generally horizontal member 422 extending down into the tank. Member 422 is appropriately supported, for example, by baffle support 424 having an opening therein 425, affixed to flange 412, for example, by bolts. Support 424 may be integral with baffle 422 and be formed, for example, by casting. However, a plurality of openings 426 are provided so that lading pressure is in communication with the vent system.

The chamber 402 (within hollow member 411) has mounted therein an elastomeric material generally indicated at 430. The elastomeric material, for example, may be mounted in the lower portion between flanges 412 and 424, and in the upper portion between plate 514 and flange 414, for example, by providing a recess 416 in the latter. An opening 432 is provided in the center section of the elastomeric material. The elastomeric material defines a circuitous path at 434 to absorb surge pressure energy which is not kept out by baffle 422 and which enters through openings 426.

In operation, in the event of a surge, if the surge has a vertical moving component, that component is first deflected by baffle means 420, particularly horizontal baffle plate 422. Horizontal components of the surge will enter through openings 426 and pass up into the surge chamber 402. In the surge chamber, the elastomeric material 430 acts to absorb surge energy and damp the same. Thus the short term pressure which is seen by burst disk 510 in the event of surge, is reduced by the baffle 422 and the elastomeric means 430, particularly circuitous path 434. Thus, according to this embodiment, the surge will be essentially dissipated by the baffle means 420 and elastomeric means 430. Thus only continuous pressure build-up unusually high and dangerous surge pressures will be seen by the burst disk 510 and in the event of a continual pressure build-up, the burst 510 will vent the system. Cover 600 having openings therein 602 and an overhang 610 to guide the vented lading as described in regard to FIGS. 2–6 is preferably provided.

The embodiment shown in FIG. 9 is similar to the embodiment shown in FIG. 8. Baffle means 420 are affixed to a lower inwardly extending portion 412 of cylindrical member 410. A burst disk 510 is provided mounted between plates 512 and 514 in upper vent system 500. An elastomeric shell 430 made, for example, of polymeric foam material such as polyurethane is provided and is mounted between lower plate 412 and plate 514. An opening 436 is provided to allow the lading to pass into the chamber 402 after passing through openings 426 in the baffle means.

As was the case in FIG. 8, the baffle means 420, particularly plate 422 acts to reduce the vertical components of the surge. That portion of the surge which enters chamber 402 is largely damped by means of elastomeric shell 430. Thus, for most surges burst plate 510 will not be subjected to the surge pressure and will only be ruptured by cutter bar 520 in the event of continual pressure build-up or extremely high surge pressures which might unduly stress other portions of the tank. A cover 600 as described above also is preferably provided, having at least one opening 602 and preferably a guiding overhang 610.

It will be apparent that the baffle means 420 shown in FIGS. 8 and 9 may also be utilized in connection with the resilient devices shown in FIGS. 2–5, 5A, 6 and 7. The baffle means function the same in these embodiments. In the event of surges in the tank, at least some of the surge is deflected by the baffle means and thus does not reach the resilient time delay means. Thus the likelihood is reduced that the safety vent system will vent in the event of surges in the tank.

What is claimed is:

1. A safety vent system for use in a tank for transporting chemicals comprising:
    at least one hollow member mounted in communication with an opening in said tank;
    a member rupturable at designed pressure mounted in at least one of said hollow members; and
    resilient means comprising a bellows mounted in cooperation with said rupturable member to absorb energy resulting from surge pressures occurring in said tank.

2. A safety vent system according to claim 1 wherein the resilient means regulates movement of the rupturable member.

3. A safety vent system according to claim 2 wherein said resilient means at least in part holds said rupturable member in place in said hollow member.

4. A safety vent system according to claim 3 wherein said safety vent system includes cutter means adapted to effect rupturing of said rupturable member at design pressure.

5. A safety vent system according to claim 4 wherein said resilient means and said rupturable member are integral.

6. A safety vent system according to claim 1 wherein the rupturable member is movably independent of movement of said resilient means.

7. A safety vent system according to claim 1 wherein the resilient means is mounted between said tank and said rupturable member.

8. A safety vent system according to claim 1 wherein said rupturable member does not rupture under surges in said tank, but will rupture when the non-surge pressure reaches approximately design level.

9. A safety vent system according to claim 1 including baffle means mounted in the lower portion of the vent system to absorb at least a portion of lading movement under surge pressure.

10. A safety vent system for use in a tank transporting chemicals comprising:
 a hollow member mounted so as to be in fluid communication with said tank;
 a member rupturable at design pressure mounted in said hollow member;
 means comprising a bellows for rupturing said rupturable member also mounted within said hollow member;
 resilient means mounted in said hollow member adapted to absorb pressure resulting from surges in said tank, but not preventing said rupturable member from rupturing when the static pressure reaches approximately design level;
 said hollow member having openings therein for venting the lading therefrom; and
 a cover having means thereon for guiding the vented lading downwardly adjacent said vent system.

11. A safety vent system according to claim 10 wherein said hollow member comprises a lower hollow member in which said rupturable member is mounted and an upper hollow member wherein said openings are located.

12. A safety vent system according to claim 11 wherein said means for rupturing said rupturable member is located within said lower member and is held in place at least partly by said upper hollow member.

13. A safety vent system according to claim 12 wherein said resilient means and said rupturable member are integral.

14. A safety vent system according to claim 10 including baffle means mounted in the lower portion of the vent system to absorb at least a portion of lading moving under surge pressure.

15. A safety vent system for use in a tank transporting chemicals comprising:
 a hollow member mounted so as to be in fluid communication with said tank;
 a member rupturable at design pressure mounted in said hollow member;
 means for rupturing said rupturable member also mounted within said hollow member;
 resilient means comprising a bellows mounted in said hollow member downstream from said rupturable member adapted to absorb pressure resulting from surges in said tank, said resilient means defining a plurality of circuitous paths for absorbing pressure surge energy therein; said hollow member having openings therein for venting the lading therefrom;

and baffle means mounted in the lower portion of said hollow member downstream from said resilient means for absorbing liquid lading energy striking the same during pressure surges.

16. A safety vent system according to claim 15 including a cover having means thereon for guiding the vented lading downwardly adjacent said vent system.

17. A pressure tank safety vent system for use in a tank for transporting chemicals comprising vent means connected to said tank and operable by a predetermined pressure within said tank to vent said tank and resilient time delay means comprising a bellows operatively connected with said vent means for delaying opening of said vent means to vent said tank until said predetermined pressure has existed for a predetermined period to time whereby said vent means is not operative to vent said tank by pressure surges of a time duration less than said predetermined period of time.

18. A pressure tank safety vent system according to claim 17 wherein in the event of a pressure surge said resilient time delay means absorb at least some energy from said pressure surge.

19. A pressure tank safety vent system according to claim 18 wherein said vent means comprises a rupturable member.

20. A pressure tank safety vent system according to claim 19 wherein said rupturable member comprises a burst plate.

21. A pressure tank safety vent system according to claim 19 wherein a cutter bar is provided to break said rupturable member at designed pressure.

* * * * *

PO-1050
(5/69)

UNITED STATES PATENT OFFICE
CERTIFICATE OF CORRECTION

Patent No. 3,845,878          Dated Nov. 5, 1974

Inventor(s) Edwin S. Carlson

It is certified that error appears in the above-identified patent and that said Letters Patent are hereby corrected as shown below:

Column 2, line 60, "pressure" should read --pressurize--. Column 3, line 60, insert a period after "disk". Column 5, line 14, "to" should read -- at --. Column 7, lines 7 and 8, "movement" should read -- moving --; line 15, delete "comprising a bellows"; line 18, after "resilient means" insert -- comprising a bellows --. Column 8, line 29, "period to time" should read -- period of time --.

Signed and sealed this 4th day of March 1975.

(SEAL)
Attest:

RUTH C. MASON
Attesting Officer

C. MARSHALL DANN
Commissioner of Patents
and Trademarks